May 16, 1933.  J. C. STAFFORD  1,909,191

AUTOMATIC GEAR SHIFT

Filed Feb. 8, 1932

John C. Stafford
INVENTOR

BY Victor J. Evans & Co.
ATTORNEYS

WITNESS:

Patented May 16, 1933

1,909,191

UNITED STATES PATENT OFFICE

JOHN C. STAFFORD, OF MARYVILLE, TENNESSEE

AUTOMATIC GEAR SHIFT

Application filed February 8, 1932. Serial No. 591,723.

The invention relates to an automatic transmission and more especially to an automatic gear shift for use in motor driven vehicles.

The primary object of the invention is the provision of mechanism of this character wherein speed changes from low to high or vice versa is automatically effected thus eliminating the usual manual shifting of the power transmission gearing for this purpose as generally employed in motor driven vehicles and in this manner relieving attention thereto on the part of an operator of such vehicle.

Another object of the invention is the provision of mechanism of this character, wherein the speed from a driving shaft to a driven shaft can be transmitted in a smooth and uniform manner by the use of a planetary gear assembly, an overrun clutch and a ball governor controlled friction clutch, thus eliminating the manual control of a shift lever by an operator for speed changes between low and high or vice versa, the speed changing being automatically taken care of through the instrumentalities mentioned and thereby obviating faulty gear changing with resultant damage to the gearing and close attention of an operator as is essential in the hand shift speed changing transmission gearing.

A further object of the invention is the provision of mechanism of this character, which is comparatively simple in construction thoroughly reliable and efficient in operation, compact, strong, durable, automatically controllable, and inexpensive to manufacture and install.

With these and other objects in view, the invention consists in the features of construction, combination and arrangement of parts as will be hereinafter more fully described in detail, illustrated in the accompanying drawing, which discloses the preferred embodiment of the invention, and pointed out in the claims hereunto appended.

In the drawing:—

Similar reference characters indicate corresponding parts throughout the several views in the drawing.

Figure 1:
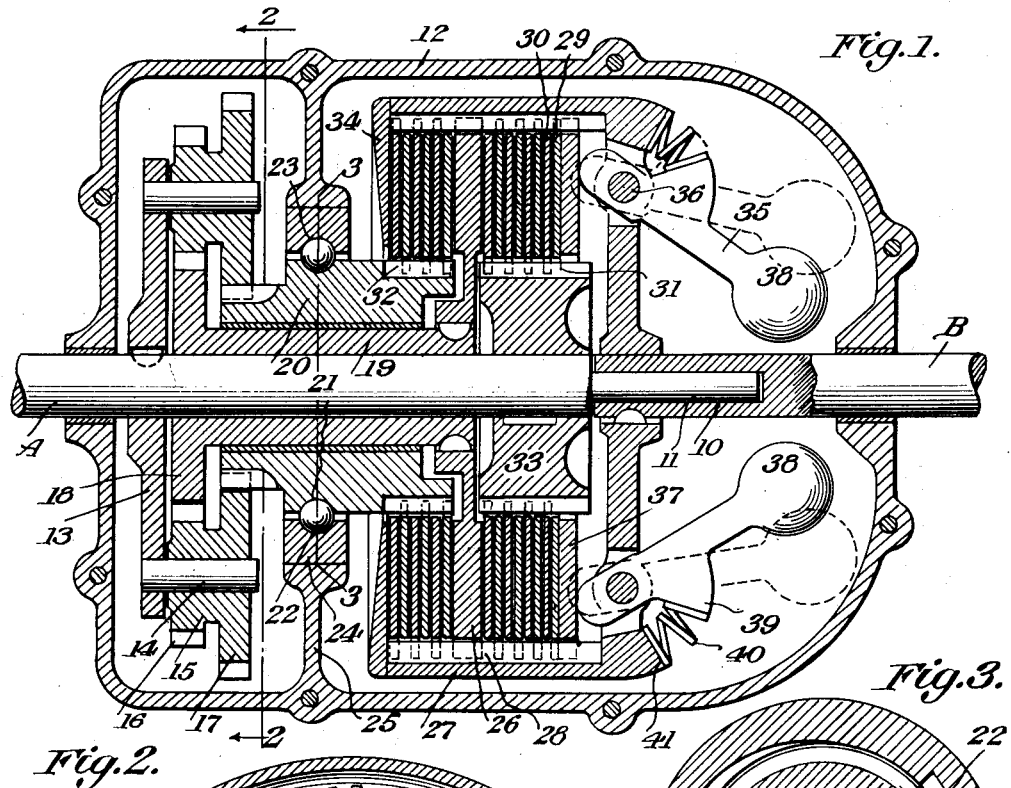
Figure 1 is a vertical longitudinal sectional view through the mechanism constructed in accordance with the invention.
Figures 2, 3:
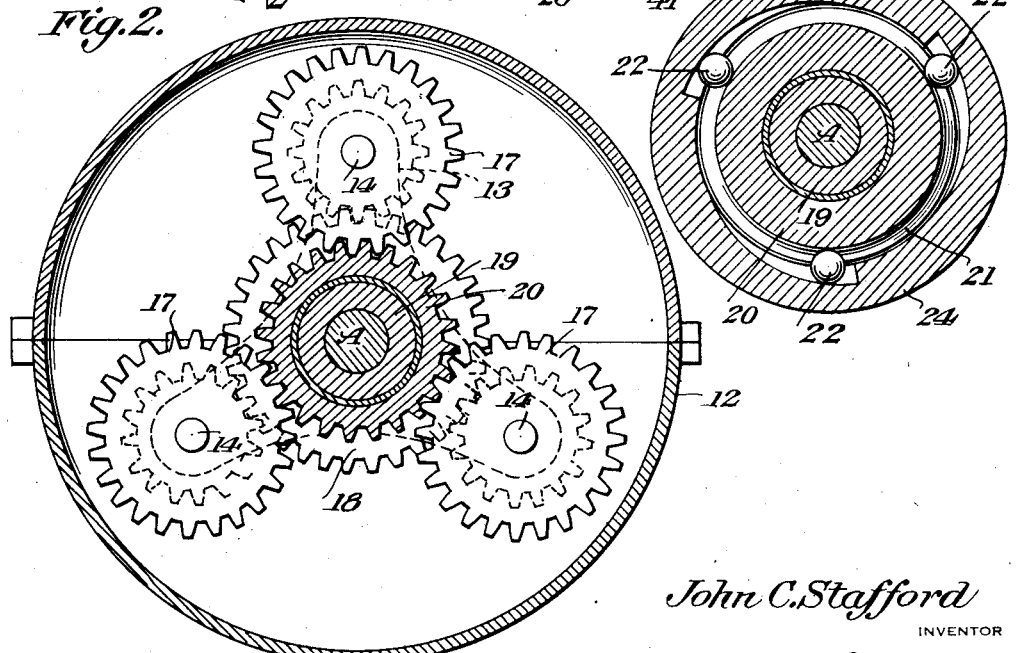
Figure 2 is a sectional view on the line 2—2 of Figure 1 looking in the direction of the arrows.
Figure 3 is a sectional view on the line 3—3 of Figure 1.

Referring to the drawing in detail, A designates generally a portion of the driving shaft A of a motor, for example, the engine of a motor driven vehicle and B the driven shaft thereof, the latter having a socket 10 for the reduced extension 11 of the driving shaft A so that these shafts will be loosely interfitted with each other internally of a casing or housing 12 for accommodating the speed changing mechanism or automatic transmission hereinafter fully described.

The casing 12 is preferably made of separable sections suitably detachably joined with each other and the speed changing or automatic transmission therein comprises a spider 13 keyed or splined to the shaft A has fixed therein stud journals 14 for duplex planet gears 15, there being preferably three of these carried upon the spider 13 and each involves the small gear 16 and large gear 17 respectively. The small gears 15 mesh with the sun gear 18 having a sleeve hub 19 loosely journaled upon the driving shaft A while encircling said sleeve 19 is an overrun clutch gear 20, the latter meshing with the large gears 17 of the said planet gears 15. This overrun clutch gear 20 has formed externally therein an annular raceway 21 for balls 22 operating in eccentrically disposed slots 23 in an overrun clutch member 24 fixed in a supporting web 25 therefor formed in the casing 12.

Fixed to the sleeve hub 19 is a separator disk 26 of a friction clutch which includes a cylindrical enclosing shell 27 having the separator disk 26 splined or keyed as at 28 therewith. Arranged on opposite sides of the separator disk 26 and confined within the shell 27 are the series of clutch rings or clutch plates 29 and 30 respectively, the rings 29 being loosely engaged with the splines or keys 28, while the clutch rings or plates 30 are splined or keyed at 31 and 32 respectively with the overrun clutch gear 20 and the collar 33 fixed to the driving shaft A, the shell 27 being fitted with a retaining cap 34 for the rings or plates 29 and 30 disposed between the same and the separator disk 26.

The shell 27 has associated or fitted therewith a ball governor including the pivot arms 35 supported upon pivots 36 carried by the shell 27, the inner ends or short lengths of these arms 35 play against a follower 37 within the shell and splined thereto by the splines or keys 28 to act against the clutch rings or plates 29 and 30. The long lengths of the arms 36 at their free ends have ball weights 38 and the jaws 39 working against coiled tensioned springs 40 seated at 41 against the shell 27, these springs being designed to normally hold the weight arms 35 inwardly close to the driven shaft B and the tension of these springs is overcome by centrifugal force for the automatic outward swinging of the arms 35 with the ball weights 38 for the operation of the governor to close the friction clutch. The shell 27 is fixedly splined or keyed to the driven shaft B for rotation therewith.

In the operation of the speed changing mechanism or automatic transmission upon rotation of the driving shaft A its power is transmitted through the sleeve hub 19 of the sun gear 18 meshing with the planetary gears 15 of the spider 13 fixed to said shaft to the separator disk 26 and shell 27 to the driven shaft B, that is, when the speed of rotation of said shaft A is low and upon an increase of speed of the said driving shaft beyond that of the driven shaft B through the ratio of the planet gears 15 and the sun gear 18 and overrun clutch gear 20, the latter will be caused to reversely travel and lock with the overrun clutch member 24 fixed in the casing 12 which is stationary and through centrifugal action the governor by its weighted arm 35 will be actuated to close the friction clutch, thus coupling the driven shaft B with the driving shaft for the transmission of its speed or travel through the wheel 33 and said friction clutch directly to the shaft B and thus cause the speed of the driven shaft to gradually increase to that of the driving shaft A. When the speed of the driving shaft A and the driven shaft B is the same the power is transmitted directly through the transmission and this being the high speed change. The low gear from the driving shaft A to the driven shaft B is transmitted through the sun gear 18, separator plate 26, shell 27 to the said driven shaft B. The ratio of the speed of the driving shaft A to that of the driven shaft B depends only upon the ratio of the planet gears 15, sun gear 18 and overrun clutch gear 20, thus it being seen that speed change from the driving to the driven shafts A and B takes place automatically so that the change takes place from a low to a high gear ratio during the movement of the motor driven vehicle and the operation of the shift lever of the transmission gearing ordinarily employed in such vehicle is only required to place the gearing into forward, neutral and reverse positions.

It is of course understood that by the usual acceleration the speed of the driving shaft A can be regulated and the planetary action with the overrun clutch in association with the ball governor friction clutch effects the automatic speed changing from low to high or vice versa between the driving and driven shafts A and B, thereby eliminating the manual shift of transmission gearing and the use of an intermediate speed change as is common in the employment of hand controlled transmission gearing employed in motor driven vehicles.

What is claimed is:—

1. In an automatic gear shift, driving and driven shafts, planetary gear assembly connected with the driving shaft, a sun gear loose upon the driving shaft and in mesh with the planetary gear assembly and having a sleeve hub, an overrun clutch having a clutch gear about said sleeve hub and meshing with the planetary gear assembly, a friction clutch carried by the driven shaft and having clutch rings loosely keyed with the overrun clutch gear and with the driving shaft, and a ball governor operative upon the friction clutch for the automatic opening and closing thereof by variance in speed ratio of the driving and driven shafts.

2. In an automatic gear shift, driving and driven shafts, planetary gear assembly connected with the driving shaft, a sun gear loose upon the driving shaft and in mesh with the planetary gear assembly and having a sleeve hub, an overrun clutch having a clutch gear about said sleeve hub and meshing with the planetary gear assembly, a friction clutch carried by the driven shaft and having clutch rings loosely keyed with the overrun clutch gear and with the driving shaft, a ball governor operative upon the friction clutch for the automatic opening and closing thereof by variance in speed ratio of the driving and driven shafts, and a stationary casing inclosing the planetary gear assembly, overrun and friction clutches and supporting the said overrun clutch.

3. In an automatic gear shift, driving and driven shafts, planetary gear assembly connected with the driving shaft, an overrun clutch operated by said assembly, a friction clutch connected with the driven shaft and coacting with the overrun clutch, a ball governor active upon the friction clutch and operative by speed ratio between the driving and driven shafts, a stationary casing inclosing the planetary gear assembly, overrun and friction clutches and supporting said overrun clutch, a sun gear meshing with the planetary gear assembly and associated with the friction clutch, and an overrun clutch gear meshing with the planetary gear assembly and associated with said friction clutch.

In testimony whereof I affix my signature.

JOHN C. STAFFORD.